Nov. 23, 1948.  V. C. EHNBORN  2,454,437
DEVICE FOR WORKING THERMOPLASTIC MATERIALS
Filed July 3, 1946  2 Sheets-Sheet 1
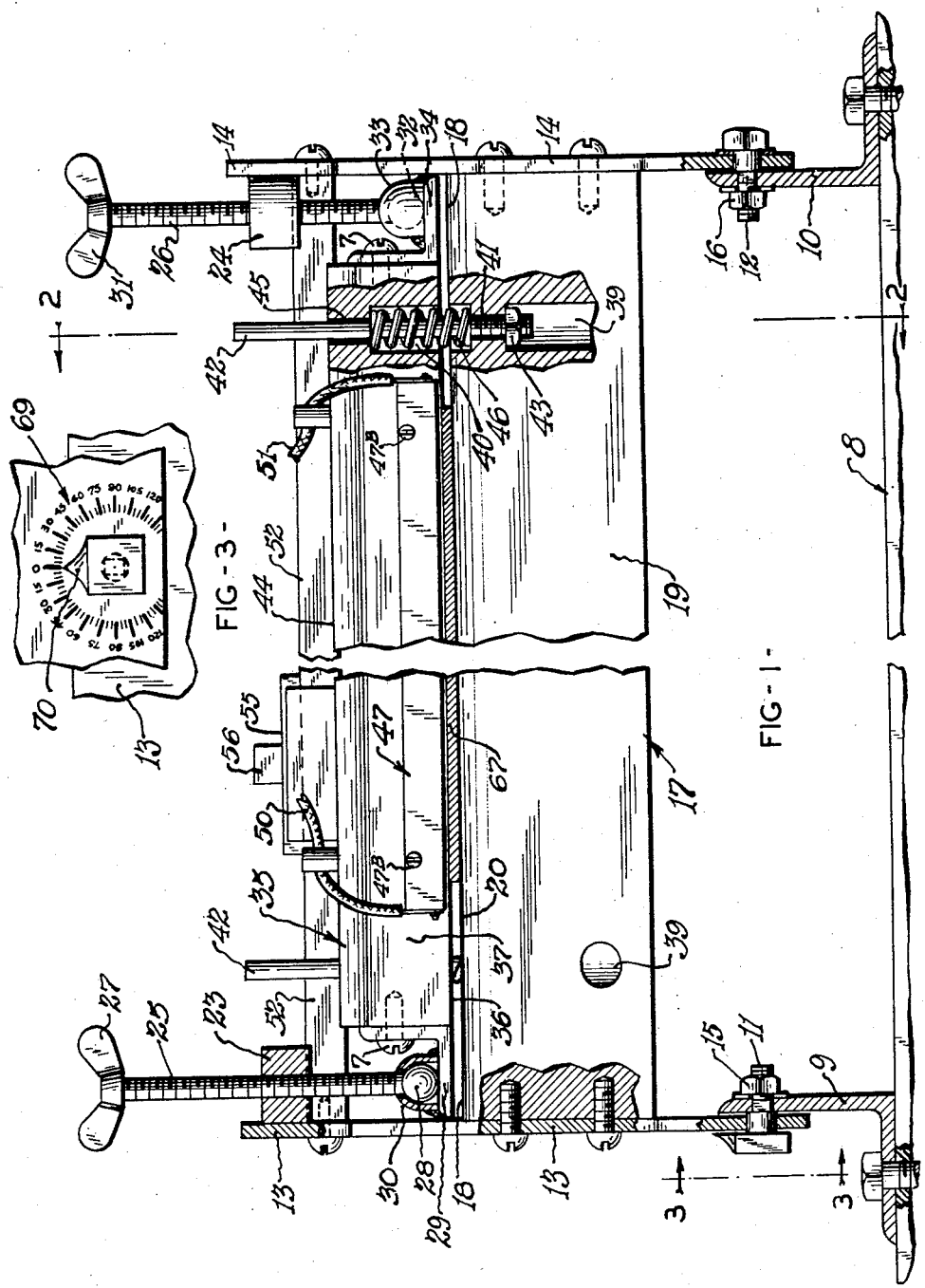
INVENTOR:
VICTOR C. EHNBORN
BY Frank J. Shraeder Jr.
ATTY.

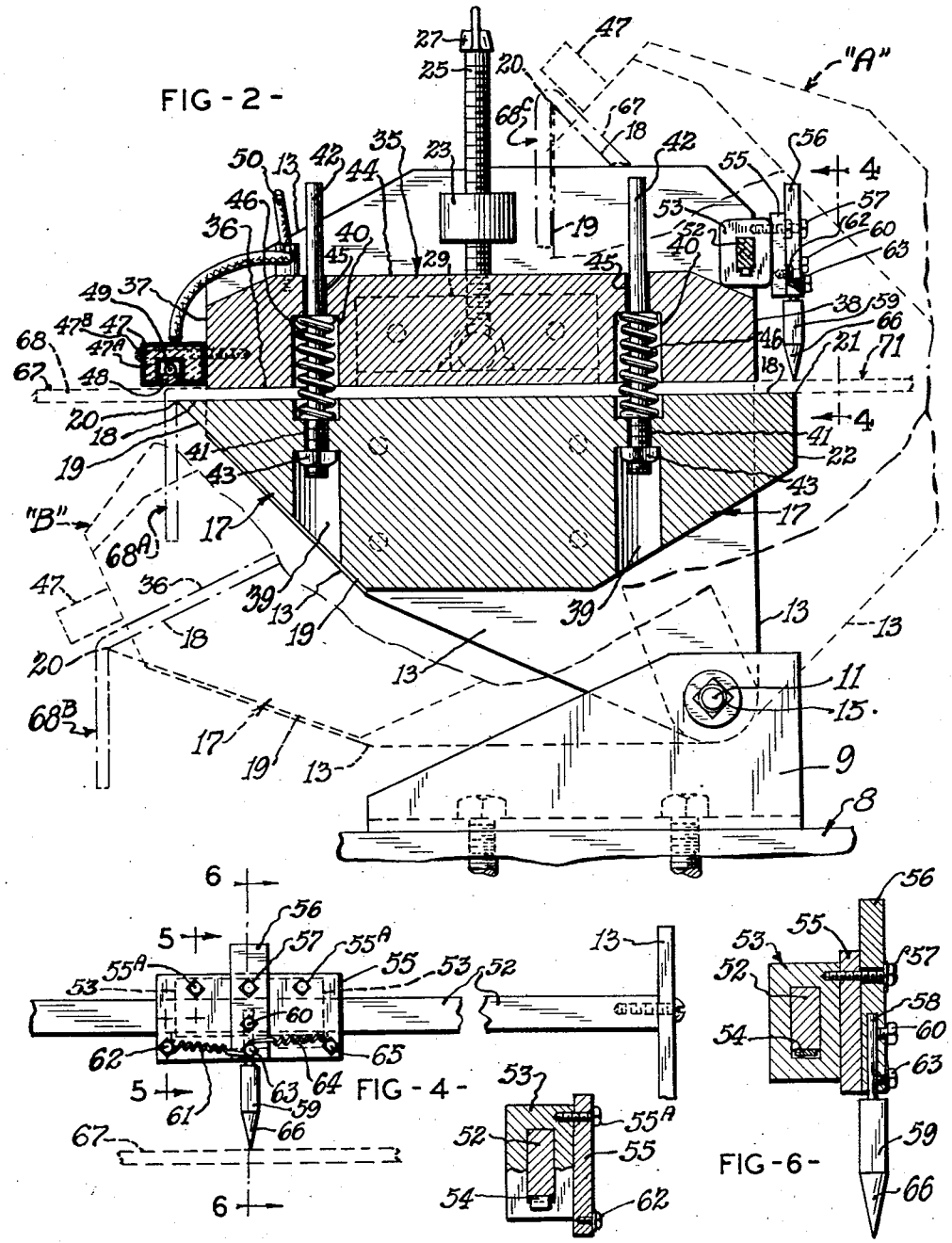

Patented Nov. 23, 1948

2,454,437

UNITED STATES PATENT OFFICE 2,454,437

DEVICE FOR WORKING THERMOPLASTIC MATERIALS

Victor Clemens Ehnborn, Honolulu, Territory of Hawaii

Application July 3, 1946, Serial No. 681,241

6 Claims. (Cl. 18—19)

This invention relates generally to devices for working thermoplastic materials. More particularly, the present invention relates to an apparatus for semi-automatically bending to a pre-selected angle or degree of curvature sheets of material which become pliable upon the application of heat thereto at the desired area of the bend or curvature of the sheet.

The relatively recent and rapid development of the plastic industry has given rise to an increasing number of applications of numerous types of plastic materials. Thus, a great number of manufacturing processes presently include steps of manipulating sheets of various plastic materials into various forms or configurations. Since a great many of the present plastic materials are thermoplastic, the step of actual manipulation of the work is generally preceded by a heat treatment to render such materials pliable. In the prior art methods, the whole sheet has usually been heated and partially plasticized throughout its entire area and has then been worked or molded to the desired configuration between dies. In other prior art instances the portion of a sheet to be bent angularly to the remaining portion thereto was placed between heated dies to effect such angular bend.

For certain purposes or uses where the desired objective of the manipulation has been no more than the formation of one or more angular bends or curved surfaces in a portion of a thermoplastic sheet the present manufacturing methods, whereby the entire sheet of material is heated, or where the portions to be bent are placed between heated dies, have proved uneconomical and frequently have the further disadvantage of warping the sheet. Dies, and the machinery to operate them, are bulky and expensive, more so than is justified by the simple operations here contemplated. Furthermore, dies are generally rigid and incapable of adjustment so that a modification in manufacturing specifications usually requires purchase of new dies or at least a change of dies in the manufacturing machinery and consequently result in increased cost and a delay in operations.

It is the principal object of my invention to provide an inexpensive, yet efficient, apparatus for working thermoplastic materials whereby such material is partially plasticized by heat only in the localized portion or area thereof to be manipulated, and wherein said material semi-automatically bends itself smoothly and evenly to a pre-selected angle or degree of curvature.

In its broad aspect, my invention comprehends means for inclining and supporting the work at any pre-selected angle to the horizontal, means for applying to the work below the portion thereof to be manipulated a fulcrum complementary to the configuration it is desired to produce in the work, and means for applying heat to the work directly above said fulcrum, thereby locally softening said work until the force of gravity causes it to bend over said fulcrum to the desired angle or configuration.

In order that my invention may be more fully disclosed, reference is had to the accompanying drawings which illustrate one form of apparatus embodying the foregoing and such other principles, advantages and capabilities as may be pointed out as this description proceeds, or as are inherent in the present invention. For purposes of clarity in exposition, the following description is explicit, and the accompanying drawings are detailed, but it is to be understood that said exposition is illustrative only, and that my invention is not limited to the particular details recited in the specification or shown in the drawings.

In the drawings:

Fig. 1 is a front elevation of a preferred embodiment of my invention, portions thereof being broken away to show interior details;

Fig. 2 is a view in vertical section taken upon the line 2—2 of Fig. 1;

Fig. 3 is a detail elevational view of the inclination scale and pointer provided at one end of the apparatus and as viewed from the direction indicated by line 3—3 of Fig. 1;

Fig. 4 is a detail elevational view of the scriber sub-assembly upon the back of the apparatus;

Fig. 5 is a view in vertical section taken upon the line 5—5 of Fig. 4; and

Fig. 6 is a view in vertical section taken upon the line 6—6 of Fig. 4.

Like reference characters are used to designate similar parts in the drawings and in the description of invention which follows:

Referring to the illustrations, the apparatus, which comprises a preferred embodiment of my invention, is shown supported upon any suitable base 8 to which is bolted a pair of horizontally-spaced angular brackets 9 and 10. A trunnion bolt 11 is journaled in the vertical flange of the bracket 9 and a second trunnion bolt 12 is similarly journaled in the bracket 10. A vertical end-plate 13 is pivotally mounted on the trunnion bolt 11, thereby adapting said end-plate to vertical angular displacement about said trunnion bolt as a pivot. A second vertical end-plate 14 is similarly pivotally mounted upon the trunnion bolt 12. Nuts 15 and 16 respectively are provided upon each trunnion bolt to secure each end-plate against its respective bracket.

The end-plates 13 and 14 support between them a work-supporting member 17 which is shown preferably in the form of a block provided with a top plane surface 18 and a front plane surface 19 disposed relatively angularly to the plane 18 and preferably receding therefrom, whereby an elongated straight substantially sharp edge 20 (best shown in Fig. 2) is formed along the top front edge of said work-supporting member 17. The top rear edge 21 of the supporting member 17 is formed by the intersection of the perpendicular rear plane surface 22 with the top surface 18. The top front edge 20 and the top rear edge 21 are parallel.

Well above the supporting member 17, two lugs 23 and 24 project towards each other from the end plates 13 and 14 respectively. Each lug is vertically internally threaded for engagement with one of the screws 25 and 26. The upper end of the screw 25 terminates in a wing nut 27 rigidly secured thereto. The lower end of the screw 25 terminates in a ball 28 bearing upon the horizontal leg of an angle iron bracket 29. The ball 28 is confined for rotation in a socket 30 welded to the upper face of said horizontal leg. The screw 26 is similarly provided with a wing nut 31 and ball 32 rotatably confined in a socket 33 welded to the horizontal leg of the angle iron bracket 34.

Fastened between the vertical legs of the angle iron brackets 29 and 34, as by the screws 7, is a clamping or work-securing member 35 poised above and cooperating with the work-supporting member 17. The clamping member 35 includes a base plane surface 36 complementary to the top surface 18 of the work-supporting member 17. The clamping member 35 is substantially less in width than the supporting member 17 and is transversely centered over the latter so that the sharp edge 20 may project beyond the front face 37 of the clamping member 35 and so that the rear edge 21 of the supporting member 17 may project beyond the rear face 38 of the clamping member 35.

The clamping member 35 and the work-supporting member 17 are provided with four longitudinally and transversely spaced holes 40 and 39 respectively, disposed perpendicularly to the surfaces 36 and 18. The holes 39 and 40 being concentrically aligned in said clamping member 35 and in said support member 17. In the supporting member 17, the holes 39 are constricted between their opposite ends, as at 41, and are internally threaded to engage with the partially threaded inner ends of the guide rods 42 which extend upwardly through the holes 40 and their restricted openings 45 and well above the clamping member 35 and perpendicularly to the top surface 18. A nut 43 secures the engagement of each guide rod 42 in its respective threaded bearing 41. In the clamping member 35, the holes 40 are constricted below the top surface 44 to form close-fitting journal bearings 45 for the guide rods 42. The base surface 36 of the member 35 is thus always maintained in parallel and complementary relation to the top surface 18 of the member 17.

It is now apparent that if the wing nuts 27 and 31 are simultaneously rotated the clamping member 35 will be progressively moved toward or away from the work-supporting member 17, depending upon the direction of rotation of said wing nuts. To aid in lifting the clamping member 35 from the supporting member 17, a helical spring 46 is provided around each guide rod 42. The springs 46 are compressed between the threaded bearings 41 and the journal bearings 45. As the work-clamping member 35 is moved closer to the work-supporting member 17, the tension in the springs 46 is increased, and said springs are selected with a sufficiently high modulus of elasticity to push the member 35 away from the member 17 when the wing nuts 27 and 31 are rotated in the proper direction.

Fastened to the front surface 37 of the clamping member 35 is an elongated casing 47 containing asbestos 47A or other insulating material. The casing 47 is secured, as by screws 47B to the clamping member 35 and is parallel to the edge 20. The lower face of said casing 47 is closed except for a longitudinal extending metallic bar 48 which is adapted to be heated by an elongated electrically energized heating filament or coil 49. The bar 48 is positioned above and slightly forwardly of the sharp edge 20 when the surfaces 18 and 36 are horizontal. Electrical leads 50 and 51 communicate from the heating coil 49 to a source of switch controlled electrical power (not shown).

Referring now more particularly to Figs. 2 and 4, a guide bar 52, parallel to the edge 21, is fastened to and between the end-plates 13 and 14 at the rear of the device slightly above the clamping member 35. A tubular sleeve-like carriage 53 is slidably mounted upon the guide bar 52. To ensure a sliding fit with some degree of friction between the carriage 53 upon the guide bar, a slightly arcuate resilient shim 54 is provided therebetween. A plate 55 is secured to the outer vertical face of the carriage 53, as by screws 55A, and a tool-holder 56 is pivotally mounted adjacent to the outer face of the plate 55 for angular displacement in a plane perpendicular to the surface 18. The pivotal connection between the plate 55 and the tool-holder 56 is secured by a screw 57 on which the tool-holder 56 is oscillatably journaled and which screw 57 has threaded support in the plate 55 and the carriage 53.

The tool-holder 56 is suitably recessed in its lower end to receive therein the shank 58 of a pointed scriber or stylus 59 (best shown in Fig. 6). A set screw 60 secures the shank 58 within the tool-holder 56.

Tension springs 61 and 64 are provided on the outer face of the plate 55. The outer end of spring 61 is secured to a screw 62 and the outer end of spring 64 is secured to screw 65 and the inner adjacent ends of both springs 61 and 64 are secured to the screw 63.

As will hereinafter become apparent, the springs 61 and 64 cause the stylus 59 to bear evenly upon the work being scored, and said springs also act as shock absorbers in the event said stylus strikes an unexpected obstruction. The entire scribing sub-assembly described being designed to position the scoring point 66 of the stylus 59 substantially directly above the rear edge 21 of the supporting member 17.

I have provided the scribing sub-assembly described above in my plastic-working apparatus because manufacturing specifications frequently call for scorings or for a straight edge parallel to a configuration of the finished piece. The convenience of using this scribing sub-assembly in combination with the other working parts of my invention will be apparent from its mode of operation, described below.

The apparatus is prepared for the reception of the work by simultaneously rotating the wing nuts 27 and 31 in a direction to lift the clamping member 35 away from the work-supporting member 17. The work, represented by the sheet 67 of thermoplastic material shown in broken lines in Figs. 2 and 4, is laid upon the surface 18 with the knife edge 20 delineating the line along which said sheet is to be bent. A portion 68 of the sheet 67 thus projects beyond the knife edge 20 as shown in Fig. 2.

The wing nuts 27 and 31 are now rotated simultaneously to move the clamping member 35 toward the supporting member 17 until the sheet 67 is firmly clamped therebetween. The nuts 15 and 16 on the trunnion bolts 11 and 12 are then loosened and the entire apparatus except the base 8 and angle iron brackets 9 and 10 is rotated to a pre-selected angle of inclination of the sheet 67. An inclination scale 69, best shown in Fig. 3, is conveniently provided upon the end-plate 13 at the trunnion bolt 11.

The scale 69, graduated in degrees, rotates with the end-plate 13 but the pointed indicator 70 remains fixed in the vertical position. Since the numbers of the scale 69 ascend upon both sides of the origin, the indicator 70 always reads upon said scale the angle of inclination between the sheet 67 and the horizontal. A simple calculation determines the angle of inclination at which the apparatus must be set to produce a bend of the desired angular magnitude in the work. If the objective bend is to be an acute angle, the apparatus is rotated clockwise as viewed in Fig. 2 into a position, as for example, that depicted in broken lines designated by A. The angle of the objective bend in the work subtracted from 90° equals the angle of inclination at which the apparatus is to be set. If the objective bend is to be an obtuse angle, the apparatus is rotated counterclockwise to position, as for example, that shown by the broken lines designated by B. The angle of the objective bend subtracted from 180° equals the angle of inclination at which the apparatus is to be set.

When the apparatus has been rotated to the selected inclination, the nuts 15 and 16 are tightened upon the trunnion bolts 11 and 12 to secure the apparatus against further rotation. An electric current is then permitted to flow in the heating coil 49 through the closing of a switch (not shown). The bar 48 concentrates the heat radiated from the coil 49 towards the local area of the sheet 67 immediately overhanging the knife edge 20. In a very short period of time, that portion of the sheet 67 within the area directly under the heated bar 48 is sufficiently plasticized and softened to permit the overhanging portion 68 to bend by the force of gravity automatically to the desired angular position.

It is obvious, that in certain apparatus of this kind the bar 48 might be eliminated, in which event the heat rays emitted directly from the filament or coil 49 would be projected through the longitudinal opening in the casing 47 now occupied by the bar 48 and the thus projected heat rays would impinge upon the narrow elongated area of the thermoplastic sheet which is disposed directly beneath the elongated opening through which the heat rays are emitted.

The current is then cut off from the coil 49 and the sheet 67 cools to rigidity in its new configuration.

The various angular bends achieved by the apparatus in the three illustrated positions are designated by respectively 68A, 68B and 68C in Fig. 2.

It should be understood that the configuration of the knife edge 20 may be altered in my invention to fit the manufacturing specifications of the work. Frequently, it is a gentle curve rather than a sharp bend that is desired in the work, in which case a projecting ledge of complementary configuration may be built into my invention in place of the knife edge 20.

Now should the manufacturing specifications require a straight edge in the work parallel to the objective bend or scoring lines similarly parallel to the objective configuration, the scribing subassembly of my apparatus is advantageously at hand. At the operator's convenience, either before or after bending the sheet 67 to the desired angle, the sheet 67 may be clamped between the clamping member 35 and the work-supporting member 17 so that the point 66 of the stylus 59 is manually manipulated to slide along the bar 52 and thereby score the sheet with the desired line. The shank 58 is adjusted in the block 56 by means of the set screws 60 and 63 so that the stylus 59 will score the sheet 67 when moved across it. The carriage 53 is then moved by hand along the guide bar 52, whereby the stylus 59 scores the desired line in the sheet. If a straight edge is to be produced at scored line, the operator simply imposes a sharp downward thrust with his hand upon the projecting portion 71 of the sheet 67 to thus break off the overhanging portion 71. A clean straight edge is thus easily, quickly and conveniently produced in the work; said edge being parallel to the new configuration produced therein at the knife-edge 20.

It now is apparent that I have provided a plastic-working apparatus which, because of its comparatively inexpensive construction, ease of operation, and convenience of use, may expect a wide field of industrial applicability. However, while I have described my invention as embodied in a specific form and operating in a specific manner for the purposes of illustration, it should be understood that I do not limit my invention thereto, since various modifications will suggest themselves to those skilled in the art without departing from the spirit of my invention, the scope of which is set forth in the annexed claims.

I claim:

1. A device for working sheets of thermoplastic material comprising: a base, including a pair of horizontally-spaced angle brackets; trunnions journaled in said brackets; a pair of vertical end plates rotatably mounted upon said trunnions; a work-supporting member fastened to and extending between said end plates and having a work-supporting face normally uppermost, said face terminating in a sharp edge parallel to the axis of rotation of said work-supporting member; means for securing said work-supporting member at a pre-selected inclination of said face; a plurality of guide rods secured to and projecting from said work-supporting member perpendicularly to said face; a clamping member centered above said work-supporting member and slidably mounted upon said guide rods, said clamping member being of substantially lesser width than said face of said work-supporting member, whereby said sharp edge projects forwardly of the forward edge of said clamping member; a plurality of springs restrained between said clamping member and said work-supporting member; a plurality of screw means for moving said clamping member toward said work-supporting member against the resistance of said springs; an elongated insulated casing supported on said clamping member above, adjacent and parallel to said sharp edge; a longitudinal groove in the bottom face of said casing, the rear edge of said groove being vertically aligned with said sharp edge; and an electrically-heated coil extending longitudinally within said casing for emitting heat from the area of said groove, whereby an elongated comparatively narrow area of a portion of a thermoplastic sheet, clamped between said clamping member and said work-supporting member, extending outwardly beyond said sharp edge may be heated by the rays emitted through said casing groove and thereby, with the aid of gravity alone, cause said outwardly extending sheet portion to bend itself smoothly and evenly until said outwardly extending portion of said sheet depends vertically from said sharp edge.

2. A device as set forth in claim 1 and including an elongated metallic bar mounted within said groove of said insulated casing, adapted to be heated by said coil, and having an exposed face at the bottom side of said casing.

3. A device as set forth in claim 1 and including means designating the inclination of said work-supporting face comprising a calibrated scale mounted on one of said end plates, and a stationary pointer mounted on one of said trunnions adjacent said scale.

4. A device for semi-automatically bending sheets of thermoplastic material, comprising: a base; a pair of vertically-spaced jaws mounted upon said base; means pivotally supporting said jaws about a common horizontal axis mounted on said base; means for securing said jaws at a pre-selected angular displacement thereof; a sharp-rimmed ledge jutting from the lower one of said jaws parallel to said axis; means for moving said jaws relatively to one another adapted to clampingly engage therebetween a sheet of thermoplastic material; and an electrical heating element supported on the upper one of said jaws adjacent the rim of said ledge, whereby heat may be applied to an elongated local area of a portion of the thermoplastic sheet extending beyond said rim until said area of said extended portion of said sheet softens under the heat from said heating element and, with the aid of gravity alone, bends itself to depend vertically from said ledge.

5. A device as set forth in claim 4 and including means for designating the inclination of said jaws comprising a calibrated scale movable with said jaws, and a stationary pointer mounted adjacent said scale adapted to register with the calibrations of said scale.

6. Apparatus for working thermoplastic sheets, comprising: a base; a pair of vertically-spaced jaws mounted upon said base to rotate about a horizontal axis; a lip protruding from the lower one of said jaws; means for securing said jaws at a pre-selected angular displacement thereof; means for opening and closing said jaws to clampingly engage therebetween a sheet of thermoplastic material; and a heating element supported on the upper one of said jaws and aligned with said lip, whereby a local area of a portion of said sheet extending beyond said lip located adjacent said heating element may be economically and conveniently heated only in said local area of said sheet to permit manipulation while so heated.

VICTOR CLEMENS EHNBORN.

REFERENCES CITED

The following references are of record in the file of this patent:

UNITED STATES PATENTS

| Number | Name | Date |
|---|---|---|
| 2,111,392 | Galey | Mar. 15, 1938 |
| 2,382,807 | Nobles | Aug. 14, 1945 |